(12) United States Patent
Fujita et al.

(10) Patent No.: US 7,429,322 B2
(45) Date of Patent: Sep. 30, 2008

(54) FUEL TANK WITH FILTERS

(75) Inventors: Yasushi Fujita, Wako (JP); Takashi Suzuki, Wako (JP); Tetsuya Arai, Wako (JP); Kazuhisa Ogawa, Wako (JP)

(73) Assignee: Honda Motor Co., Ltd. (JP)

(*) Notice: Subject to any disclaimer, the term of this patent is extended or adjusted under 35 U.S.C. 154(b) by 0 days.

(21) Appl. No.: 10/980,525

(22) Filed: Nov. 3, 2004

(65) Prior Publication Data

US 2005/0109685 A1 May 26, 2005

(30) Foreign Application Priority Data

| Nov. 20, 2003 | (JP) | ............................ 2003-391447 |
| Nov. 20, 2003 | (JP) | ............................ 2003-391451 |
| Nov. 20, 2003 | (JP) | ............................ 2003-391453 |

(51) Int. Cl.
*B01D 35/027* (2006.01)

(52) U.S. Cl. .............. 210/172.4; 210/172.6; 210/416.4; 210/251

(58) Field of Classification Search ................. 210/172, 210/416.4
See application file for complete search history.

(56) References Cited

U.S. PATENT DOCUMENTS

| 1,055,744 | A | * | 3/1913 | Hans | ........................... 210/305 |
| 1,058,133 | A | * | 4/1913 | Yourtree | ....................... 210/313 |
| 1,072,371 | A | * | 9/1913 | Stone | ........................... 137/590 |
| 1,083,413 | A | * | 1/1914 | Smith | ........................... 210/313 |
| 1,113,683 | A | * | 10/1914 | Pfahler | ....................... 210/313 |
| 1,157,643 | A | * | 10/1915 | Kuhn | ........................... 137/546 |
| 1,191,741 | A | * | 7/1916 | Scull | ............................ 210/172 |
| 1,305,355 | A | * | 6/1919 | Gulick | ....................... 184/6.24 |
| 1,394,011 | A | * | 10/1921 | Hills | ........................... 210/172 |
| 1,518,686 | A | * | 12/1924 | Bland | ........................ 210/172 |
| 1,623,728 | A | * | 4/1927 | Hooton | ....................... 210/534 |
| 2,002,407 | A | * | 5/1935 | Lemke | ........................ 210/533 |
| 2,057,779 | A | * | 10/1936 | Jacobs | ......................... 210/172 |
| 2,253,509 | A | * | 8/1941 | Dort | ............................. 210/148 |
| 2,261,915 | A | * | 11/1941 | Korte et al. | ............... 417/423.3 |
| 2,339,303 | A | * | 1/1944 | Tillery | ......................... 220/564 |
| 2,419,146 | A | * | 4/1947 | Kimm et al. | ........... 222/189.11 |
| 2,512,877 | A | * | 6/1950 | Rike | ............................. 210/172 |
| 2,770,362 | A | * | 11/1956 | Paquin | ....................... 210/304 |
| 2,788,125 | A | * | 4/1957 | Webb | ....................... 210/172.4 |
| 2,877,903 | A | * | 3/1959 | Veres | ......................... 210/462 |

(Continued)

FOREIGN PATENT DOCUMENTS

JP 55010543 1/1980

(Continued)

*Primary Examiner*—Robert James Popovics
(74) *Attorney, Agent, or Firm*—Adams & Wilks

(57) ABSTRACT

A fuel tank used for a general-purpose engine comprises a hollow tank body for storing fuel and a filter disposed within the tank body. The tank body has a bottom with a trap having an internal surface portion lying in a first plane. The filter comprises a tubular body extending from the internal surface portion of the trap and a fluororesin element supported by the tubular body so that a main surface of the fluororesin element lies in a second plane disposed at an angle of inclination relative to the first plane. The fluororesin element has a property of not allowing water to pass therethrough but allowing fuel to pass therethrough.

6 Claims, 15 Drawing Sheets

U.S. PATENT DOCUMENTS

| | | | | |
|---|---|---|---|---|
| 2,905,327 | A * | 9/1959 | Phillips | 210/463 |
| 2,923,411 | A * | 2/1960 | Oster | 210/172 |
| 2,933,188 | A * | 4/1960 | Jacula | 210/172 |
| 3,020,950 | A * | 2/1962 | Schraivogel | 137/549 |
| 3,023,905 | A * | 3/1962 | McDougal et al. | 210/172 |
| 3,061,104 | A * | 10/1962 | Schaffner | 210/172 |
| 3,291,184 | A * | 12/1966 | Varvel | 431/121 |
| 3,729,273 | A * | 4/1973 | Shimrony | 417/79 |
| 3,749,250 | A * | 7/1973 | Oldford | 210/448 |
| 4,077,884 | A * | 3/1978 | Naumann | 210/172.3 |
| 4,107,052 | A * | 8/1978 | Yoshino et al. | 210/534 |
| 4,179,036 | A * | 12/1979 | Pasini | 220/563 |
| 4,354,521 | A * | 10/1982 | Harde | 137/571 |
| 4,371,181 | A * | 2/1983 | Monigold et al. | 280/834 |
| 4,397,333 | A * | 8/1983 | Liba et al. | 137/574 |
| 4,453,564 | A * | 6/1984 | Bergesio | 137/574 |
| 4,503,885 | A * | 3/1985 | Hall | 137/574 |
| 4,595,030 | A * | 6/1986 | Yazaki | 137/203 |
| 4,842,006 | A * | 6/1989 | Scheurenbrand et al. | 137/202 |
| 4,853,125 | A * | 8/1989 | Hanabusa | 210/172 |
| 5,085,768 | A * | 2/1992 | Murakami et al. | 210/222 |
| 5,596,971 | A * | 1/1997 | Kidokoro | 123/516 |
| 5,722,374 | A * | 3/1998 | Kidokoro et al. | 123/516 |
| 5,746,185 | A * | 5/1998 | Kidokoro et al. | 123/516 |
| 5,746,186 | A * | 5/1998 | Kidokoro | 123/516 |
| 5,776,341 | A * | 7/1998 | Barnard et al. | 210/306 |
| 5,924,445 | A * | 7/1999 | Ambrose et al. | 137/549 |
| 6,210,458 | B1 * | 4/2001 | Shindo et al. | 55/486 |
| 6,241,883 | B1 * | 6/2001 | Noda | 210/172.3 |
| 6,283,731 | B1 * | 9/2001 | Yoshioka | 417/423.3 |
| 6,293,420 | B1 * | 9/2001 | Richter et al. | 220/563 |
| 6,500,338 | B2 * | 12/2002 | Baah | 210/266 |
| 6,953,527 | B2 * | 10/2005 | Brower et al. | 210/295 |
| 7,086,389 | B2 * | 8/2006 | Yamada | 123/516 |
| 7,134,568 | B2 * | 11/2006 | Moriyama et al. | 220/563 |
| 7,329,339 | B2 * | 2/2008 | Kimisawa et al. | 210/136 |
| 2002/0162777 | A1 * | 11/2002 | Baah | 210/85 |
| 2004/0159602 | A1 * | 8/2004 | Brower et al. | 210/295 |
| 2004/0251194 | A1 * | 12/2004 | Brzozowski et al. | 210/416.4 |
| 2005/0023201 | A1 * | 2/2005 | Sato | 210/172 |
| 2005/0029173 | A1 * | 2/2005 | Kimisawa et al. | 210/136 |
| 2005/0029180 | A1 * | 2/2005 | Kimisawa et al. | 210/172 |
| 2005/0061723 | A1 * | 3/2005 | Matsushita | 210/171 |
| 2005/0109685 | A1 * | 5/2005 | Fujita et al. | 210/172 |
| 2005/0178368 | A1 * | 8/2005 | Donahue et al. | 123/520 |
| 2005/0274364 | A1 * | 12/2005 | Kirk et al. | 123/519 |
| 2006/0016741 | A1 * | 1/2006 | Moriyama et al. | 210/172 |
| 2006/0180535 | A1 * | 8/2006 | Yu et al. | 210/172 |

FOREIGN PATENT DOCUMENTS

| | | |
|---|---|---|
| JP | 04123364 | 11/2002 |
| JP | 03083187 | 3/2003 |

* cited by examiner

FUEL TANK WITH FILTERS

FIELD OF THE INVENTION

The present invention relates to fuel tanks with a filter for separating foreign matter such as water and dirt in fuel.

BACKGROUND OF THE INVENTION

A fuel tank with a filter formed of a fluororesin element has conventionally been known (e.g., see Japanese Utility Model Laid-Open Publication No. HEI-4-123364). The fuel tank disclosed in this publication will be described with reference to FIG. 21.

Referring to FIG. 21, an overflow passage 202 is formed around a filler cap 201. In a portion connecting the overflow passage 202 to a fuel tank 203 is provided a fuel reservoir 204 for temporarily holding fuel overflowing through a fluororesin filter 205. The overflow passage 202 has a drain hole 206 through which to let rainwater out.

Fuel overflowed when fuel is fed into the fuel tank 203 is separated by the fluororesin filter 205 into water and fuel. Fuel passes through the filter 205 and is collected through the fuel reservoir 204 in the fuel tank 203. On the other hand, water such as raindrops passes through the drain hole 206 and is discharged into a drain passage 207.

However, since the filter 205 is disposed in parallel with the bottom of the drain passage 207, water remaining in the overflow passage 202 can cover the top surface of the filter member 205. If water covers the filter 205, the water film will exert a blocking effect, preventing passage of fuel, and making smooth filtration impossible.

Therefore, desired is a fuel tank which can smoothly filter fuel containing water, over a long period of time.

Also, a fuel tank with a filter (or a strainer) provided in a fuel filler hole of a fuel tank body has been known (e.g., Japanese Patent Laid-Open Publication No. 2003-83187). The fuel tank disclosed in this publication will be described with reference to FIG. 22.

A fuel filler hole 302 is provided at the top of a tank body 301 shown in FIG. 22. A strainer 303 is provided in the filler hole 302, and the filler hole 302 is covered by a cap 304. The strainer 303 is attached to one end of a string body 305, and a stopper 306 is attached to the other end thereof.

The strainer 303 includes a plurality of openings 308 formed in a side wall 307 and another portion, and a metal mesh 309 attached to the openings 308 for catching and filtering out foreign matter.

The string body 305 is prevented from being pulled out above a certain level from the tank body 301 by the stopper 306. Since the cap 304 and the strainer 303 are connected to the one end of the string body 305, the strainer 303 and the cap 304 are prevented from falling off the tank body 301 or being lost.

When fuel is injected, the metal mesh 309 attached to the strainer 303 can catch foreign matter in the fuel. However, water contained in the fuel cannot be separated.

Fuel contaminated with water accumulates in the fuel tank, or can cause the problem that it enters an engine and its induction system.

To deal with this, a sump and a drain plug are generally provided at the bottom of the fuel tank body to remove water accumulated on the bottom as appropriate. However, it is not easy to detect the presence and the amount of water and other matter accumulated in the tank.

To detect the presence and the amount of water and other matter, it has been proposed to provide a viewing window at the fuel tank. However, the addition of a drain plug and a viewing window leads to an increase in product cost.

Therefore, there is a desire for a fuel tank which can separate water and other matter entering the fuel tank over a long period of time, and can facilitate checking the amount of separated water, at low cost.

For another example, Japanese Utility Model Laid-Open Publication No. SHO-55-10543 discloses a fuel tank with a fluororesin element having the property of not allowing water to pass through it but allowing fuel to pass through it, so as to separate water contained in the fuel from the fuel. The fuel tank disclosed in this publication will be described in detail with reference to FIG. 23.

As shown in FIG. 23, a fuel feeding pipe 403 connects a fuel tank 401 to a fuel pump 402, and a fluororesin element 404 is provided inside the fuel tank 401 in such a manner as to enclose a fuel suction opening 403a of the fuel feeding pipe 403. Reference numeral 405 denotes a drain valve provided at a bottom portion 401a of the fuel tank 401.

Fuel in the fuel tank 401 is sucked through the fuel suction opening 403a by the fuel pump 402. At that time, water contained in the fuel is separated by the fluororesin element 404 which encloses the fuel suction opening 403a, and accumulates on the bottom portion 401a. Water accumulated on the bottom portion 401a is let out through the drain valve 405, and thus water in the tank 401 is removed.

To remove water accumulated in the fuel tank 401, a sump and the drain valve 405 provided at the bottom portion 401a are opened and closed as appropriate. However, it is difficult to detect the presence and the amount of water accumulated in the tank 401. In order to detect the presence and the amount of water, a viewing window is provided at the fuel tank in some cases. However, the addition of a drain plug and a viewing window leads to an increase in product cost.

Thus, there is a demand for a fuel tank with a filtration mechanism of a simple configuration and which can be manufactured at low cost which can facilitate checking water separated 5 by filtration and allows removal of water.

SUMMARY OF THE INVENTION

According to an aspect of the present invention, there is provided a fuel tank used for a general-purpose engine, which comprises: a tank body for storing fuel; and a filter provided in a fuel passage within the tank body and comprising a fluororesin element having a property of not allowing water to pass therethrough but allowing fuel to pass therethrough.

In an embodiment, the filter preferably comprises a vertically elongated tubular body having an upper surface and at least one side surface, and the fluororesin element is provided at least one surface thereof in an inclined manner with respect to the tubular body.

Since the element is attached to the tubular body in an inclined manner with respect to the tubular body in the fuel tank as described above, it takes much time for water separated by the element to cover the entire upper surface of the element. That is, since the element is inclined, separated water moves downward along the inclination of the element to collect, and an upper portion of the element performs the function of filtering fuel. Thus, it takes long for separated water to be increased to cover the entire surface of the element constituting the filtration surface, and it is possible to filter fuel over a longer period of time as compared with a horizontally disposed conventional filter.

The tubular body preferably comprises walls which do not allow fuel and water to pass therethrough, except at upper and lower openings, and the inclined element is provided in such a manner as to cover the upper opening. Consequently, foreign matter such as water, dirt, sand, mud or broken pieces of plants separated from fuel falls down, accumulating on a lower portion outside of the tubular body. That is, fuel is efficiently separated from foreign matter such as water, and the foreign matter is effectively removed.

The tank body preferably includes a filler port formed at an upper surface of the tank body, and a fuel introducing passage extending from the filler port inwardly of the tank body. The filter is provided at a lower end of or midway along the fuel introducing passage. When fuel contaminated with water enters from the filler port through the fuel introducing passage into the filter, the fuel passes through the filter and accumulates in the fuel tank while the water remains in the filter. In this manner, fuel can be separated from water. Since the filter is provided in the fuel introducing passage, water accumulated in the filter can be easily removed by tilting the filter, for example. As a result, water is prevented from staying in the fuel tank and causing the problem that it enters the engine and its induction system.

The fluororesin element of the filter is preferably provided in an orientation or location in which the element can be seen from the filler port. Thus, water accumulated in the filter can be easily visually recognized, and the presence or absence of water in the fuel tank can be easily determined. Thus, it is possible to find the accumulation of water by visually checking the fluororesin element after feeding, for example, and smoothly move into a water removing operation. This eliminates the need to provide a viewing window to check water accumulated in the fuel tank.

The fluororesin element of the filter is preferably provided at an inclination with respect to a horizontal plane. Consequently, an open margin can be provided until separated water increases in the fluororesin element and covers the entire upper surface of the element constituting the filtration surface. This makes it possible to separate water and other material over a longer period of time as compared with the case of providing no inclination. In addition, smooth fuel feeding into the fuel tank can be maintained.

The tank body preferably comprises an upper tank member having a filler port and a lower tank member having a fuel outlet port. The filter is disposed in such a manner as to be held by division surfaces between the upper tank member and the lower tank member.

As described above, since the filter is formed of the fluororesin element, and the filter is disposed in such a manner as to be held by the division surfaces of the upper tank member and the lower tank member when the upper tank member is joined to the lower tank member, the filter can be firmly fixed by a simple configuration. Thus, the need for a supporting member for mounting the filter is eliminated, and product and production costs can be greatly reduced.

Since the filter is provided in a location where it can be seen from the filler port, water accumulated in the filter can be easily visually recognized, and the presence or absence of water in the fuel tank can be easily determined, and accumulated water can be quickly removed.

When fuel contaminated with water enters from the filler port through the fuel introducing passage into the fuel tank, the fuel passes through the filter and accumulates in the fuel tank while the water remains on the filter. The water remaining on the filter can be easily removed by tilting the fuel tank. Thus, water is prevented from staying in the fuel tank for a long period of time, and internal corrosion of the fuel tank by water can be avoided.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
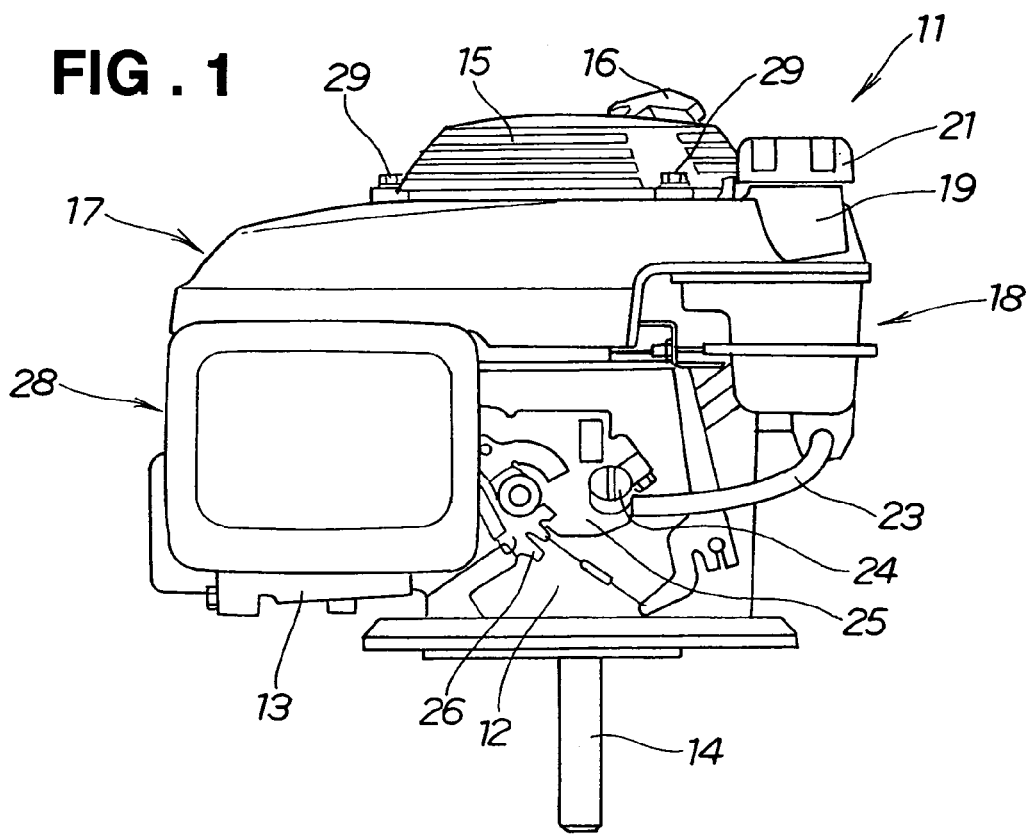
FIG. 1 is a side view of an engine with a fuel tank according to a first embodiment.

Reference is now made to FIG. 1 illustrating a general-purpose engine unit 11 employing a fuel tank according to the present invention. The engine unit 11 includes a crankcase 12, a cylinder block 13 bolted to the crankcase 12, and a crankshaft 14 extending vertically from the crankcase 12.

A recoil starter 15 by which to manually actuate an engine is mounted on the upper end of the crankshaft 14. The recoil starter 15 has a starter grip 16 attached via a string. A lower end portion of the crankshaft 14 constitutes an output shaft.

The engine unit 11 also includes a fan shroud 17, a fuel tank 18, a filler port 19 and a filler cap 21. A fuel feeding pipe 23 extending downward from the bottom of the fuel tank 18 is connected to a carburetor 25 via a fuel cock 24. Reference numeral 26 denotes a throttle lever. An air cleaner 28 supplies filtered clean air to the carburetor 25.

Figure 2:
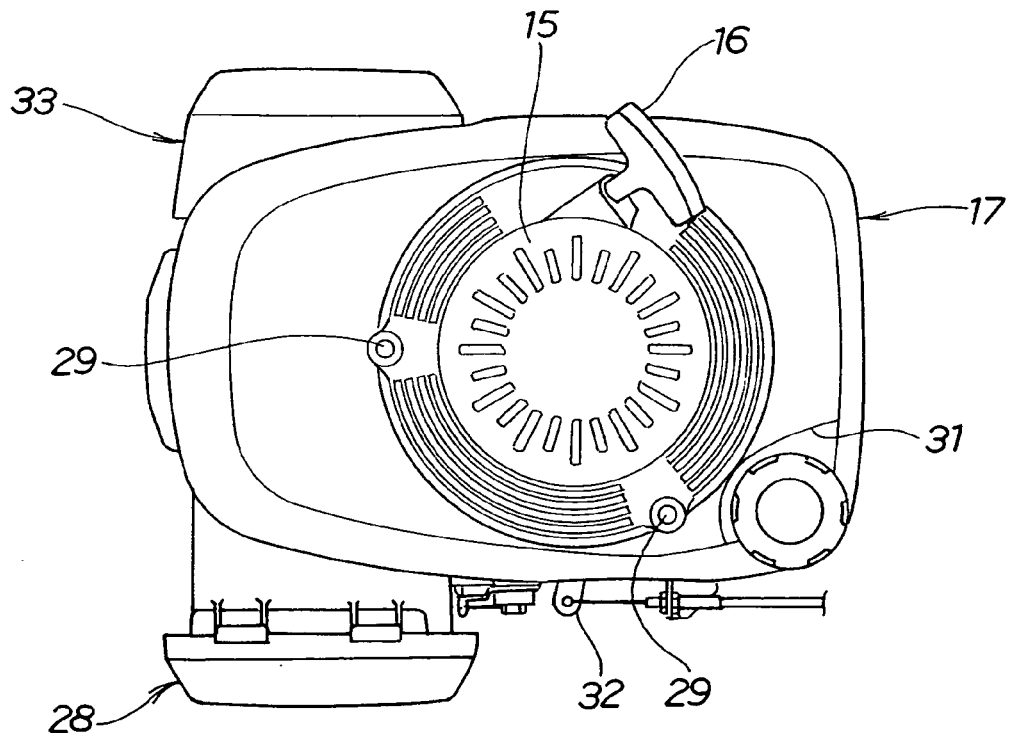
FIG. 2 is a plan view of the engine shown in FIG. 1.

As shown in FIG. 2, the engine unit 11 has the fan shroud 17 fixed with a plurality of fastening bolts 29. The fan shroud 17 has a weir 31 formed at its upper corner. The weir 31 prevents fuel from entering the inside of the fan shroud 17 during fuel feeding. Reference numeral 32 denotes a brake lever, and 33, a silencer.

Figure 3:
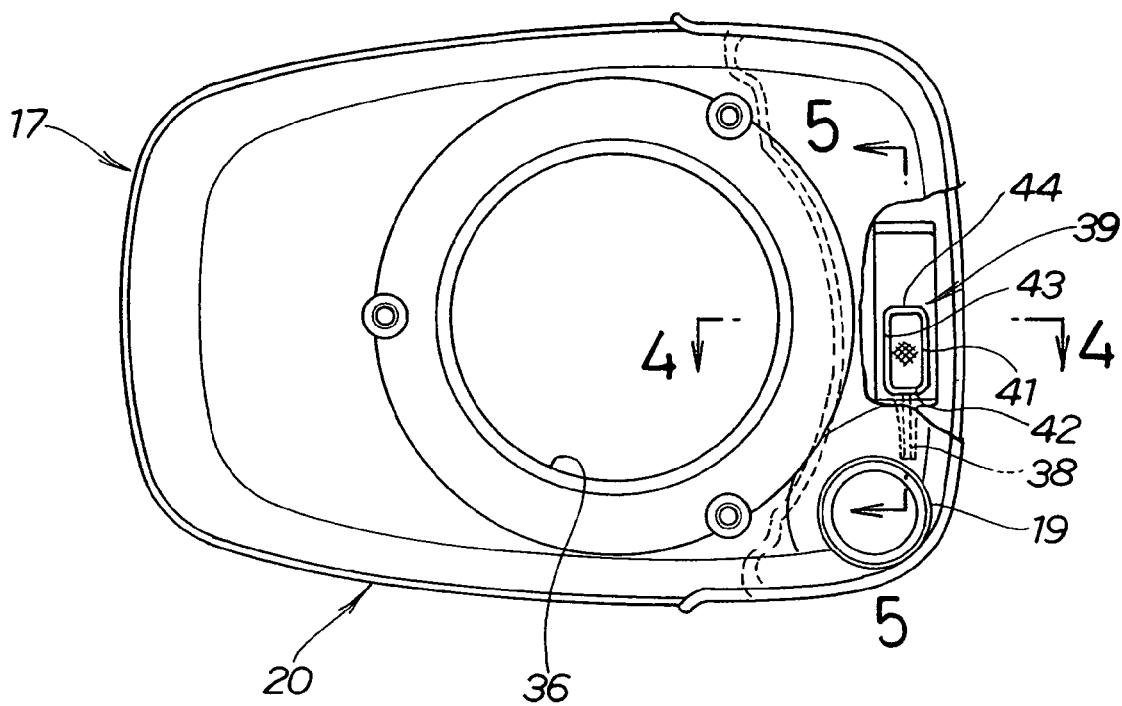
FIG. 3 is a plan view of the fuel tank according to the first embodiment.

FIG. 3 illustrates the fuel tank 18 shown in FIG. 1. The fuel tank 18 includes a tank body 20. A hole 36 for the recoil starter is formed in a substantially central portion of the top surface of the fan shroud 17 which doubles as an upper half of the tank body 20. The fuel filler port 19 is provided beside the hole 36.

Figure 4:
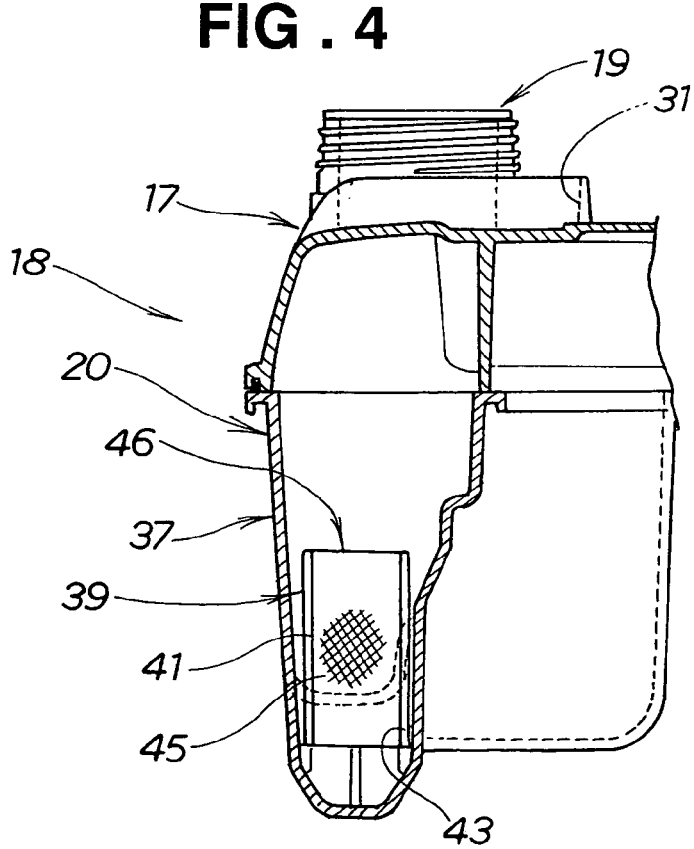
FIG. 4 is a cross-sectional view taken along line 4-4 of FIG. 3.

As shown in FIG. 4, a fuel tank member 37 as a lower half of the tank body 20 is fixed to the bottom of the fan shroud 17 which doubles as the upper half of the tank body 20. The material of both the fan shroud 17 and the fuel tank member 37 is an olefin material, and the fixing is done by heat bonding. The fixing is not limited to that by an olefin material and heat bonding. For example, the fixing can alternatively be done by using steel plates as the material, and bending the periphery of one member and folding it back.

A tubular body 39 is provided upright to extend upward from the bottom of the fuel tank member 37. The tubular body 39 includes a fluororesin element 45 having the property of not allowing water to pass through it but allowing fuel to pass through it.

With reference returned to FIG. 3, a fuel outlet port 38 is provided in an extending manner at the fuel tank member 37 (see FIG. 4), and the tubular body 39 is provided at the inlet of the fuel outlet port 38. The tubular body 39 includes, clockwise in FIG. 3, a first vertical wall 41, a second vertical wall 42, a third vertical wall 43, and a fourth vertical wall 44.

Figure 5:
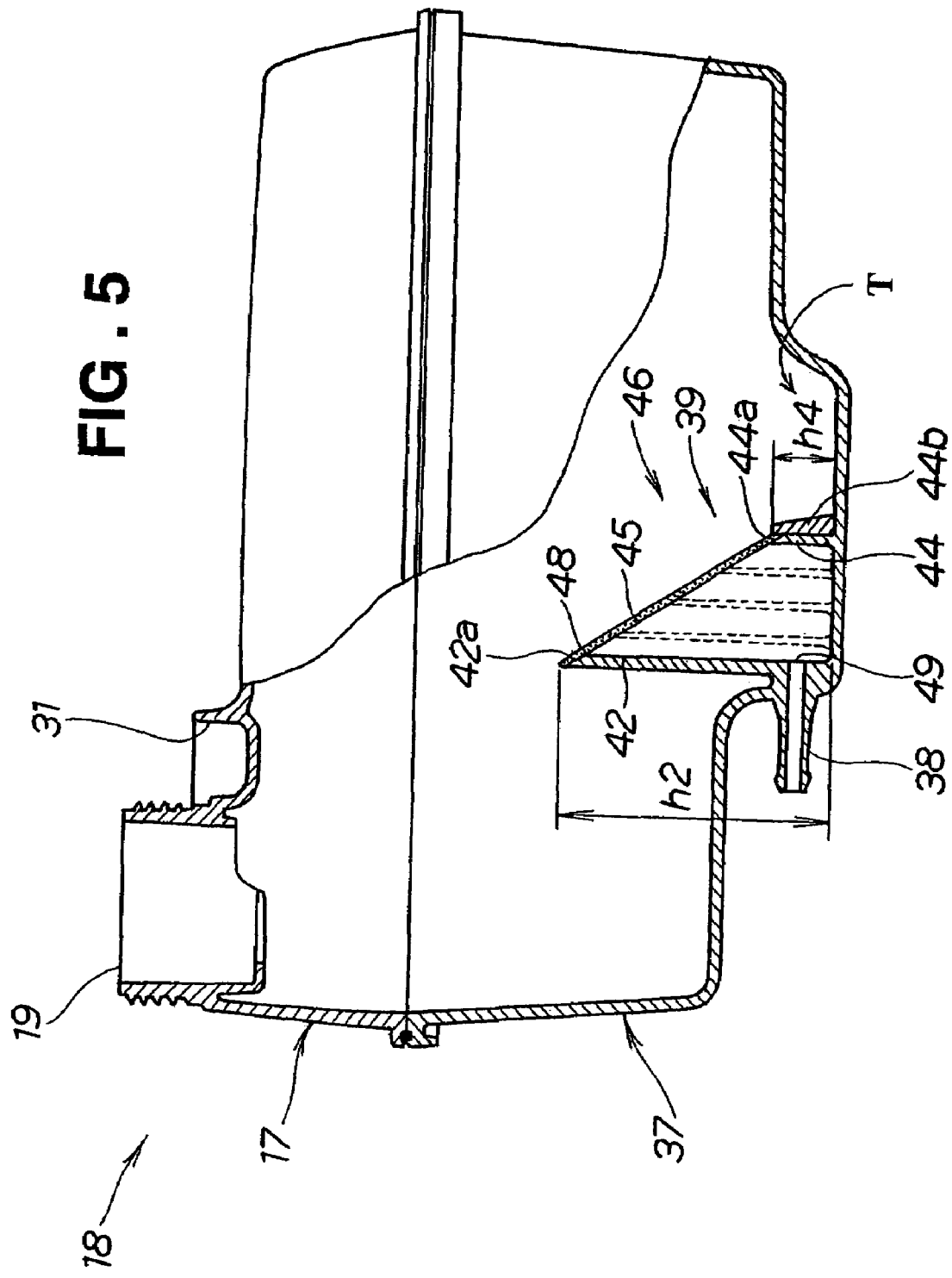
FIG. 5 is a cross-sectional view taken along line 5-5 of FIG. 3.
Figure 7:
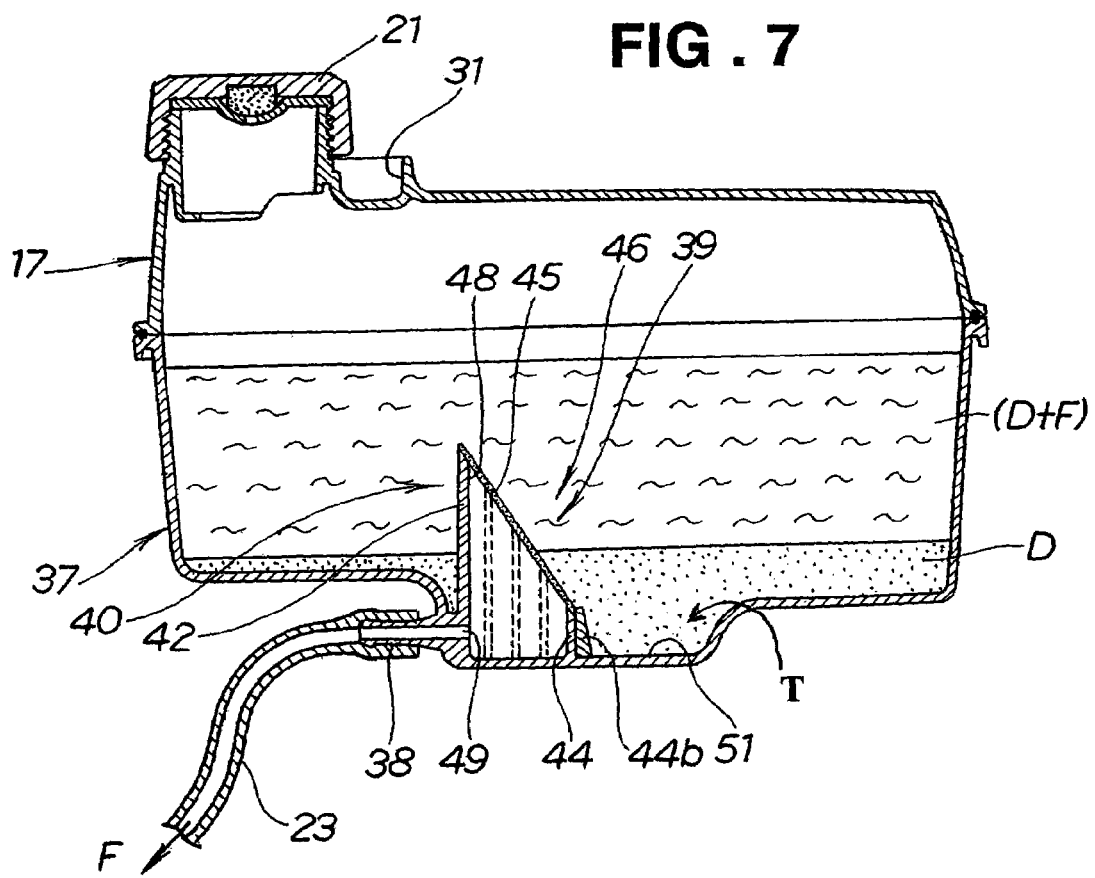
FIG. 7 is a diagram illustrating a state in which water is separated from fuel.

As shown in FIG. 5, the tubular body 39 is set upright in such a manner as to extend upward from the bottom of the fuel tank member 37. More specifically, the bottom of the fuel tank member 37 includes an integrally formed water trap T therein as shown in FIGS. 5 and 7. The tubular body 39 extends into the trap.

A filter 46 consists of the vertically elongated tubular body 39 and the element 45. The tubular body 39 has an upper end portion cut slantingly, and the element 45 is attached in an inclined manner to the slantingly-cut upper end of the tubular body 39. The tubular body 39 is formed with walls or wall portions which do not allow fuel and water to pass through them, except at an upper opening 48 and the inlet of the fuel outlet port 38 as a lower opening 49. The element 45 is attached in such a manner as to cover the upper opening 48 of the tubular body 39.

More specifically, the tubular body 39 is set upright in such a manner that the height h2 of its second vertical wall 42 is greater than the height h4 of its fourth vertical wall 44, that is, h4<h2, and the element 45 is provided between an upper surface 42a of the second vertical wall 42 and an upper surface 44a of the fourth vertical wall 44. The fuel outlet port 38 is provided in such a manner as to extend horizontally from an inner lower portion of the tubular body 39. The fourth vertical wall 44 extends from an internal surface portion of the trap T and is reinforced with a rib 44b.

As shown in FIG. 4, the first vertical wall 41 and the third vertical wall 43 have a trapezoidal shape. The tubular body 39 consisting of the four vertical walls 41, 42, 43 and 44 and the element 45 constitute the filter 46.

The function of the fuel tank 18 according to this invention will be described below.

Figure 6:
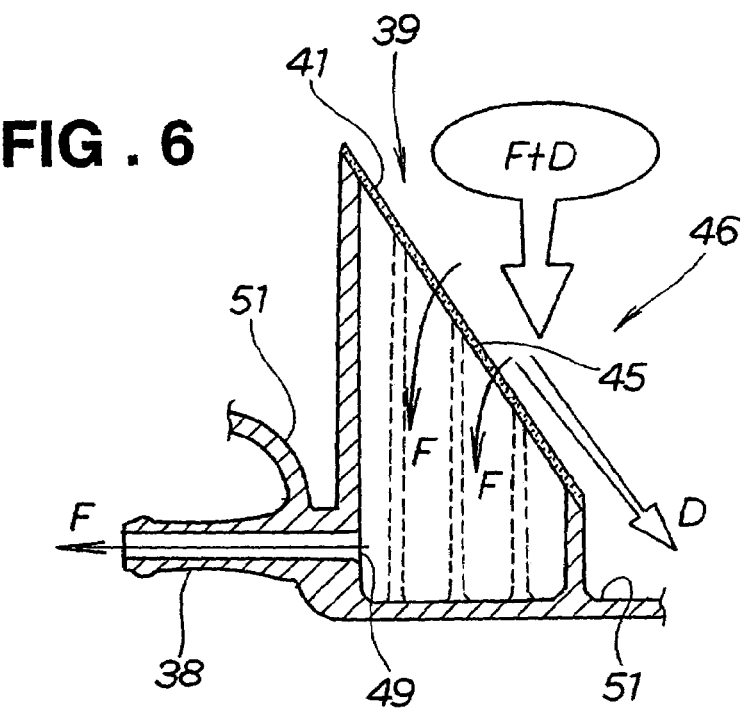
FIG. 6 is a functional diagram of a fluororesin element disposed at an inclination.

FIG. 6 illustrates the filter 46 in detail.

When fuel contaminated with water and other matter (F+D) reaches the element 45, only the fuel F passes through it while the foreign matter D such as water, dirt, sand, mud or grass does not pass through it but falls down along the inclined element 45 to be collected at the bottom of the tubular body 39. As a result, water and other foreign matter are effectively removed.

FIG. 7 illustrates a state in which water is separated from fuel.

Since the filter 46 has the inclined element 45, water separated from fuel by the element 45 flows downward along the element 45. Therefore, it takes long for the entire surface of the element 45 to be covered by water. That is, since the element 45 is provided in an inclined manner, even when water accumulates at a lower portion of the element 45, an upper portion thereof functions as a filter.

Thus, ensured is extra time taken by separated water D to be increased to cover the entire upper surface of the element 45, which allows smooth filtration of fuel over a long period of time as compared with a horizontally disposed conventional filter. As a result, smooth fuel feeding through the fuel feeding pipe 23 is maintained.

As described above, since the tubular body 39 constituting part of the filter 46 is comprised of a wall 40 which does not allow fuel and water to pass through it, except at the upper opening 48 and the lower opening 49, and the element 45 is attached at an inclination to cover the upper opening 48, foreign matter D such as water, dirt, sand, mud or grass separated by the element 45 falls down along the inclination of the element 45, and is collected at the bottom portion 51 of the fuel tank member 37 outside of the tubular body 39.

Figure 8:
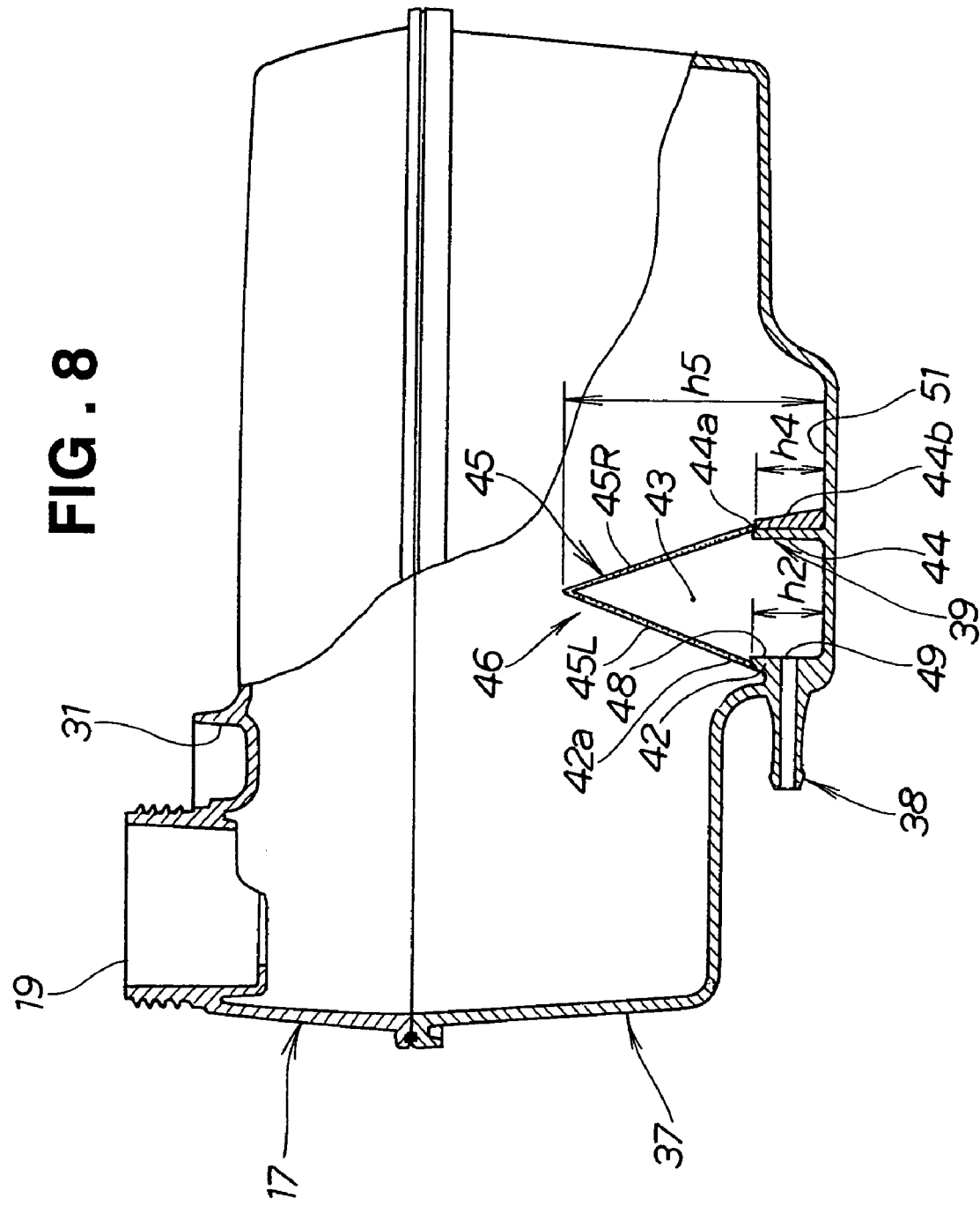
FIG. 8 is a diagram illustrating a modification of the first embodiment shown in FIG. 5.

FIG. 8 illustrates a modification of the filter 46 shown in FIG. 5.

A tubular body 39 is provided upright to extend upward from the bottom of a fuel tank member 37, and a triangular fluororesin element 45 is provided on the tubular body 39 in an oppositely inclined manner. The height of the element 45 is h5. The element 45 is comprised of inclined right and left element members 45R, 45L.

A second vertical wall 42 and a fourth vertical wall 44 as components of the tubular body 39 are such that the height h2 of the second vertical wall 42 is substantially the same as the height h4 of the fourth vertical wall 44. The left element member 45L is attached to an upper edge 42a of the second vertical wall 42, and the right element member 45R is attached to an upper edge 44a of the fourth vertical wall 44. Reference numeral 44b denotes a reinforcing rib for the fourth vertical wall 44.

A third vertical wall 43 and a first vertical wall 41 shown in FIG. 3 have a substantially pentagonal shape. A filter member 46 in this modification is comprised of the tubular body 39 consisting of the four vertical walls 41, 42, 43 and 44 and the right and left element members 45R, 45L.

This modification shows an example in which the inclined element 45 attached to the tubular body 39 has two sides, but, in this invention, it may alternatively have three sides, and is not limited in the number of its inclined sides.

The above-described embodiment shows an example in which a tubular body with vertical walls has a rectangular cross-sectional shape, but, in this invention, it is not limited to a rectangular shape, and may alternatively be a circular shape or an elliptical shape, for example.

Further, in this invention, it is acceptable to replace part of or all of vertical walls constituting a tubular body with an element. For example, all vertical walls may be replaced with an element to form an entire filter with the element.

Now, the structure of a fuel tank according to a second embodiment will be described with reference to FIGS. 9 to 11.

Figure 9:
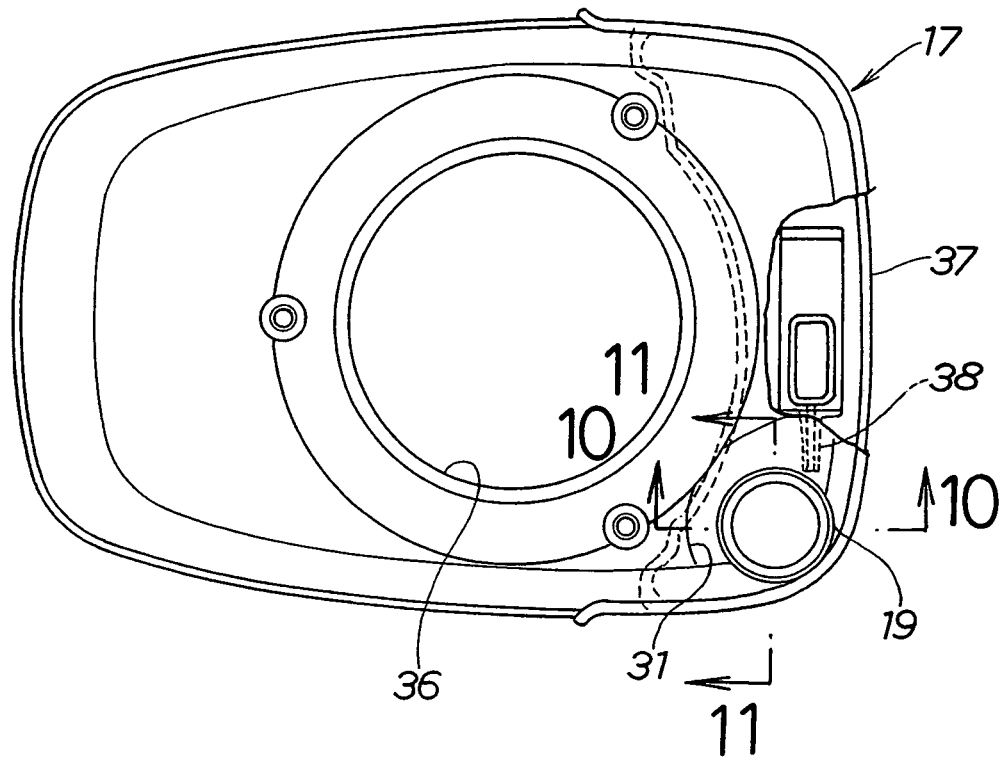
FIG. 9 is a plan view of a fuel tank according to a second embodiment.
Figure 10:
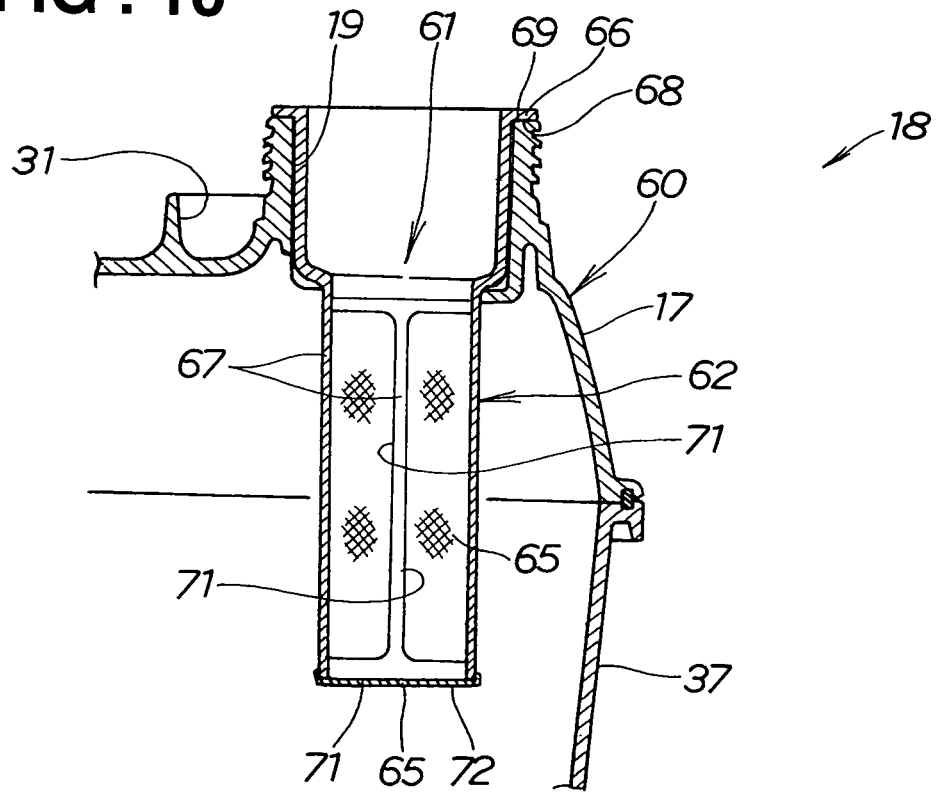
FIG. 10 is a cross-sectional view taken along line 10-10 of FIG. 9.

Referring to FIGS. 9 and 10, a fuel tank 18 of the second embodiment has a tank body 60. The tank body 60 consists of a fan shroud 17 doubling as an upper half of the tank body 60, and a fuel tank member 37 constituting a lower half. A lower peripheral edge of the fan shroud 17 is fixed to an upper peripheral edge of the fuel tank member 37. A fuel outlet port 38 is provided at the bottom of the fuel tank member 37.

The fuel tank 18 has the hollow tank body 60, a filler port 19 formed at the top of the tank body 60, a fuel introduction or introducing passage 61 extending from the filler port 19 inwardly of the tank body 60, and a filter 62 provided midway along the fuel introducing passage 61. The filter 62 includes a fluororesin element 65 having the property of not allowing water to pass through it but allowing fuel to pass through it. The element 65 is provided in a location where it can be seen from the filler port 19.

The filter 62 consists of a tubular body 67 inserted toward the fuel introducing passage 61, and the element 65 attached to a plurality of openings 71 formed in the side of the tubular body 67 and an opening 71 formed in a lower end 72.

The tubular body 67 has a collar 66 protruding radially at its upper end. A lower surface 68 of the collar 66 is abutted on an upper edge 69 of the filler port 19, and the filter 62 is fixed to the filler port 19 by a fixing means, whereby the filter 62 is attached to the tank body 60. The fixing means may be heat bonding, for example, or may be another method.

The filter 62 is fixed to the filler port 19 so as to prevent the filter 62 from floating up by a buoyant force acting on the filter 62 when the liquid surface of fuel in the tank body 60 rises above the lower end 72 of the filter 62, nearly filling up the tank during feeding. However, depending on circumstances, it may be unnecessary to fix the filter 62 to the filler port 19.

In the above embodiment, the material of both the fan shroud 17 forming the upper half of the fuel tank 18 and having the filler port 19, and the fuel tank member 37 forming the lower half, is an olefin material, and the fixing is done by heat bonding, but the present invention is not limited to an olefin material and fixing by heat bonding. For example, it may alternatively be possible to use steel plates as the material, and bend the periphery of one member to hold another member therebetween, thereby to fix them to one another.

Figure 11:
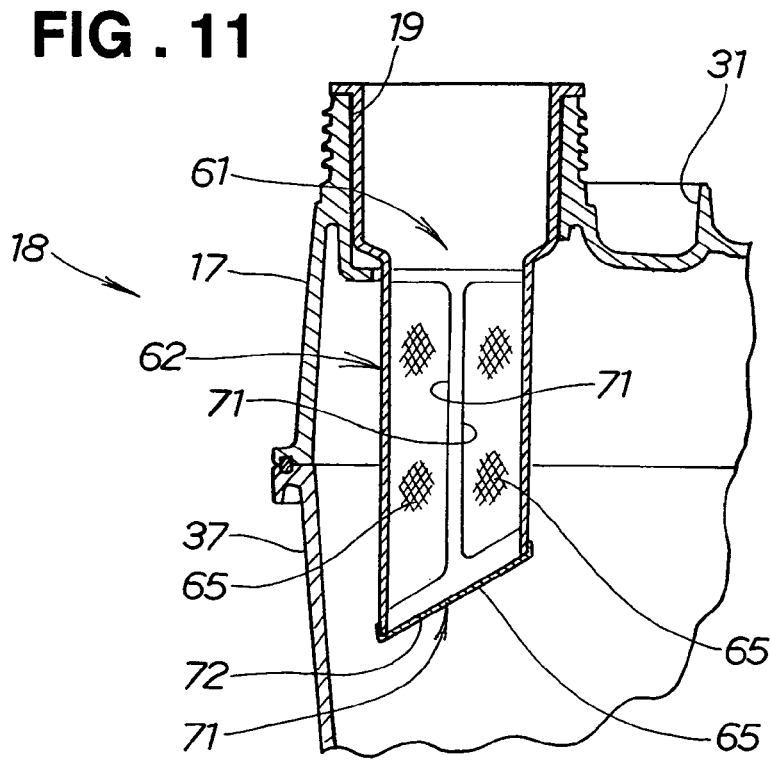
FIG. 11 is a cross-sectional view taken along line 11-11 of FIG. 9.

As shown in FIG. 11, a fluororesin element 65 is attached to a lower end 72 of a slantingly-cut tubular body 67. That is, the element 65 is attached to the end 72 of the tubular body 67 in an inclined manner with respect to a horizontal plane.

Alternatively, it may be possible not to form the inclined lower end 72 of the tubular body 67 with an opening but to form it with a bottom plate not allowing fuel and water to pass through it, instead of attaching an element thereto, as appropriate.

The use of the fuel tank 18 of the second embodiment will be described below with reference to FIGS. 12 to 14.

Figure 12:
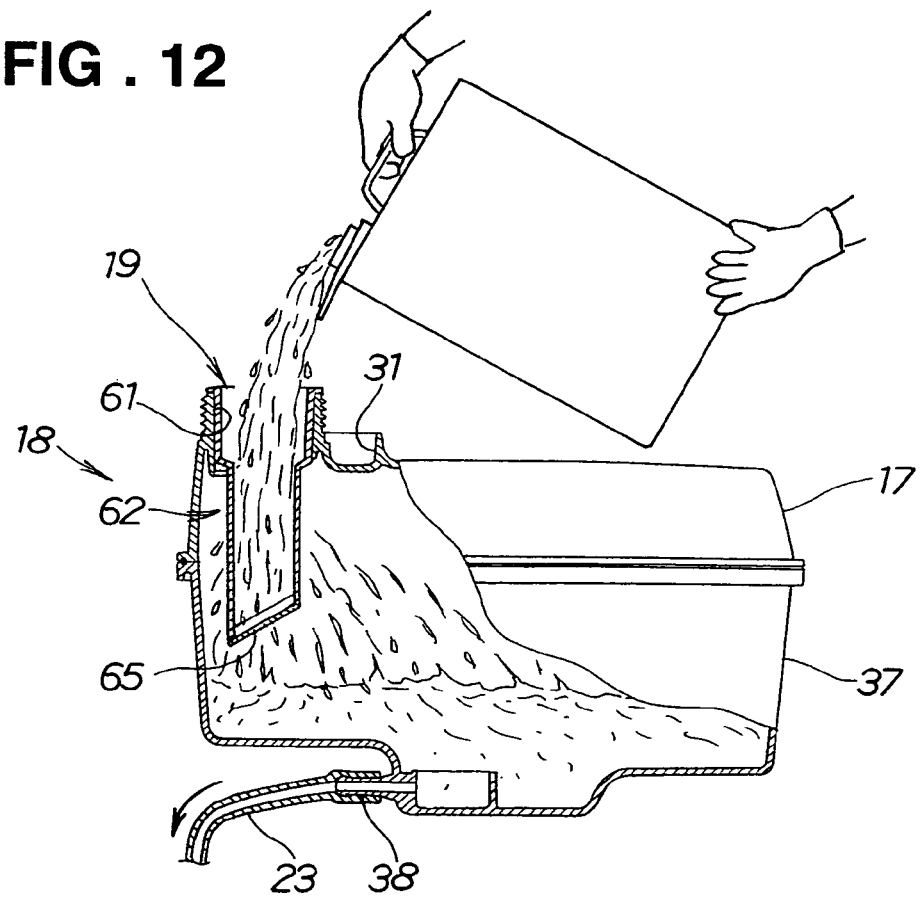
FIG. 12 is a diagram illustrating a state in which fuel is being fed to the fuel tank in the second embodiment.

As shown in FIG. 12, when fuel is fed through the opened filler port 19 of the fuel tank 18, the fuel passes through the filter 62 into the fuel tank 18.

Figure 13:
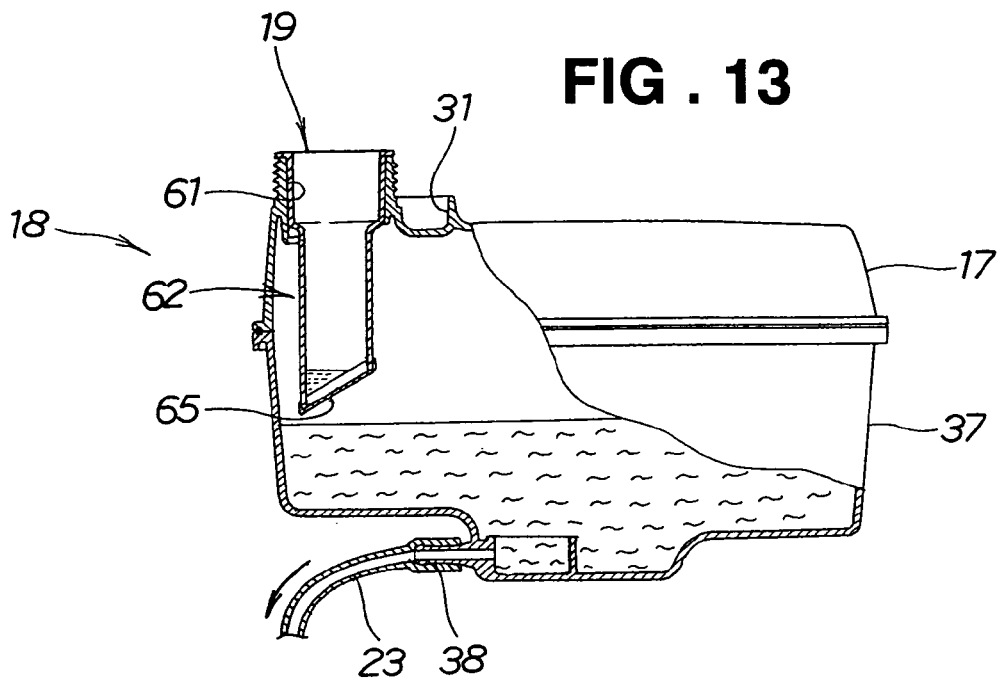
FIG. 13 is a diagram illustrating a state subsequent to the state shown in FIG. 12, in which water is separated from fuel.

As shown in FIG. 13, when fuel contaminated with water enters from the filler port 19 through the fuel introducing passage 61 into the filter 62, the fluororesin element 65 of the filter 62 allows the fuel to pass through the element 65 to accumulate in the fuel tank 18, and the water is left inside the filter 62.

Since the filter 62 is provided in the fuel introducing passage 61, water accumulated in the filter 62 can be easily removed by tilting the filter 62, for example.

As a result, water can be prevented from staying in the fuel tank 18, resulting in the prevention of the problem that water enters a fuel tank, an engine and its induction system.

Since the fluororesin element 65 is provided in an orientation or location in which it can be seen from the filler port 19, water accumulated in the filter 62 can be easily visually recognized. Since water accumulated in the fuel tank 18 can be easily visually recognized, the presence or absence of water in the fuel tank 18 can be easily determined.

As a result, it is made possible to find the accumulation of water by visually checking the fluororesin element 65 after feeding, for example, and smoothly move into a water removing operation.

Figure 14:
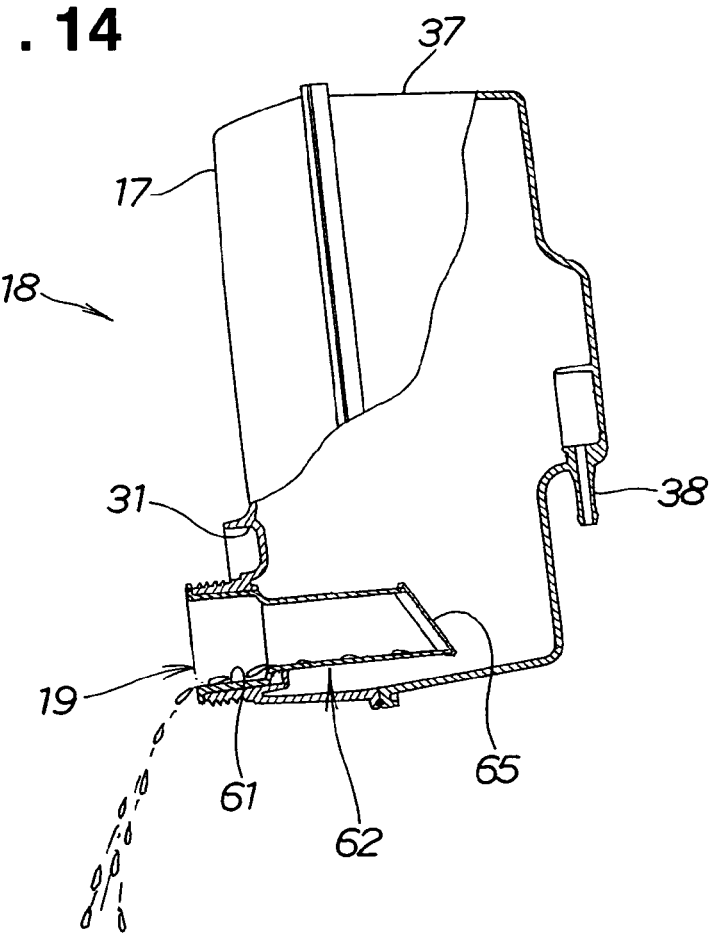
FIG. 14 is a diagram illustrating a state in which water separated from fuel is being removed.

As shown in FIG. 14, after fuel remaining in the fuel tank 18 is drawn out, the fuel tank 18 is demounted from the engine and put in a sideways position, thereby to remove separated water and other matter from the fuel tank 18.

Alternatively, it is acceptable to pump water and other matter out by a suction means such as a pipette without demounting the fuel tank 18 from the engine.

As described above, water accumulated in the fuel tank 18 can be easily visually recognized and removed without adding a drain plug and a viewing window, which results in a reduced fuel tank cost.

Figure 15A:
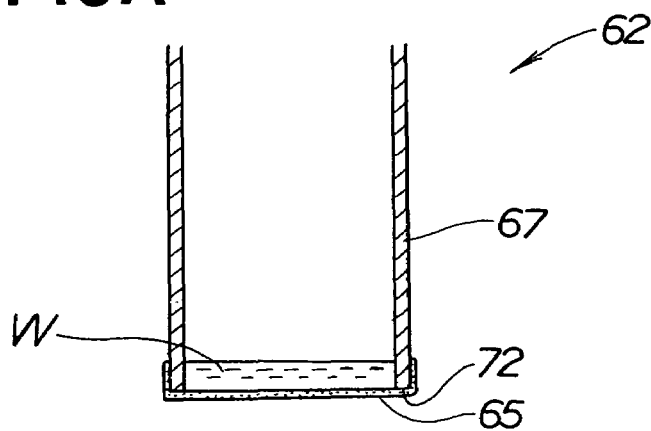
FIGS. 15A to 15C are functional diagrams of a fluororesin element attached at an inclination.
Figure 15B:
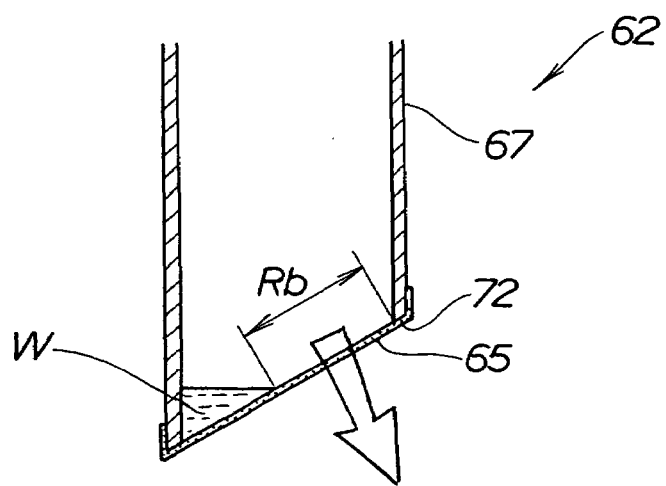
Figure 15C:
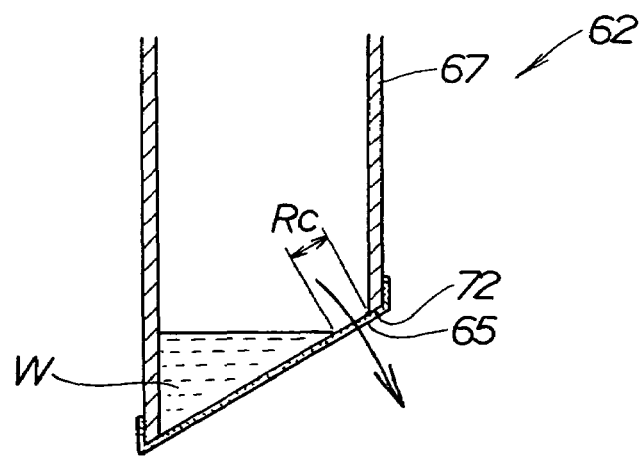

FIG. 15A to 15C are functional diagrams of a fluororesin element disposed in an inclined manner, in which the fluororesin element 65 is disposed at an inclination with respect to a horizontal plane.

Referring to FIG. 15A, when the element 65 is disposed horizontally at the lower end 72 of the tubular body 67, water separated and accumulated in the fluororesin element 65 will immediately cover the entire top surface of the element 65. Thus, if even a small amount of water W is accumulated on the element 65, the water W will cover the element 65, preventing continuous filtration of fuel.

Referring to FIG. 15B, the element 65 is inclined with respect to a horizontal plane, and is thus able to provide an open margin Rb even when separated water W accumulates on the element 65. Since the provided open margin Rb is thus large, smooth fuel filtration can be continued, separating water from fuel.

Referring to FIG. 15C, when separated water W accumulates on the element 65 to an increased amount, an open margin Rc is made smaller. However, the inclined surface formed at the lower end has not yet been covered entirely, allowing continuous fuel filtration.

As described above, since the open margin R can be provided, it is made possible to separate water and other material over a longer period of time as compared with the case of providing no inclination, and to maintain smooth fuel feeding into the fuel tank 18.

Now, the structure of a fuel tank according to a third embodiment will be described with reference to FIGS. 16 to 18.

Figure 16:
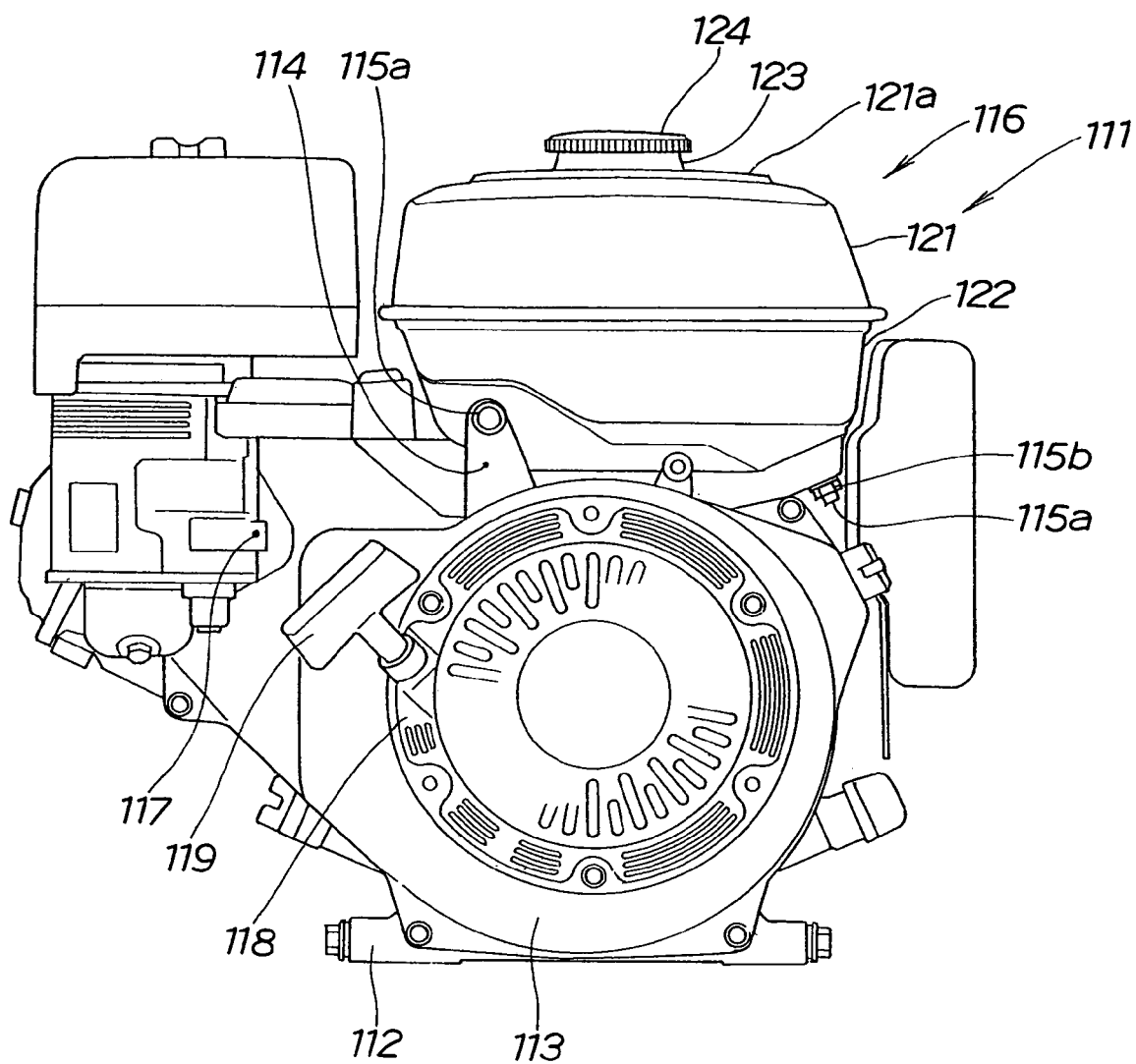
FIG. 16 is a side view of an engine with a fuel tank according to a third embodiment provided thereon.

FIG. 16 illustrates an engine provided at its top with a fuel tank according to the third embodiment.

An engine 111 shown in FIG. 16 has a crankcase 112, a body 113 mounted on the crankcase 112 by bolting, a fuel tank 116 mounted on top of the body 113 via a tank bracket 114 and bolts and nuts 115a, 115b, a recoil starter 118 mounted to the body 113, and a starter grip 119 attached to the recoil starter 18 via a string. Reference numeral 117 denotes a fuel cock lever.

Figure 17:
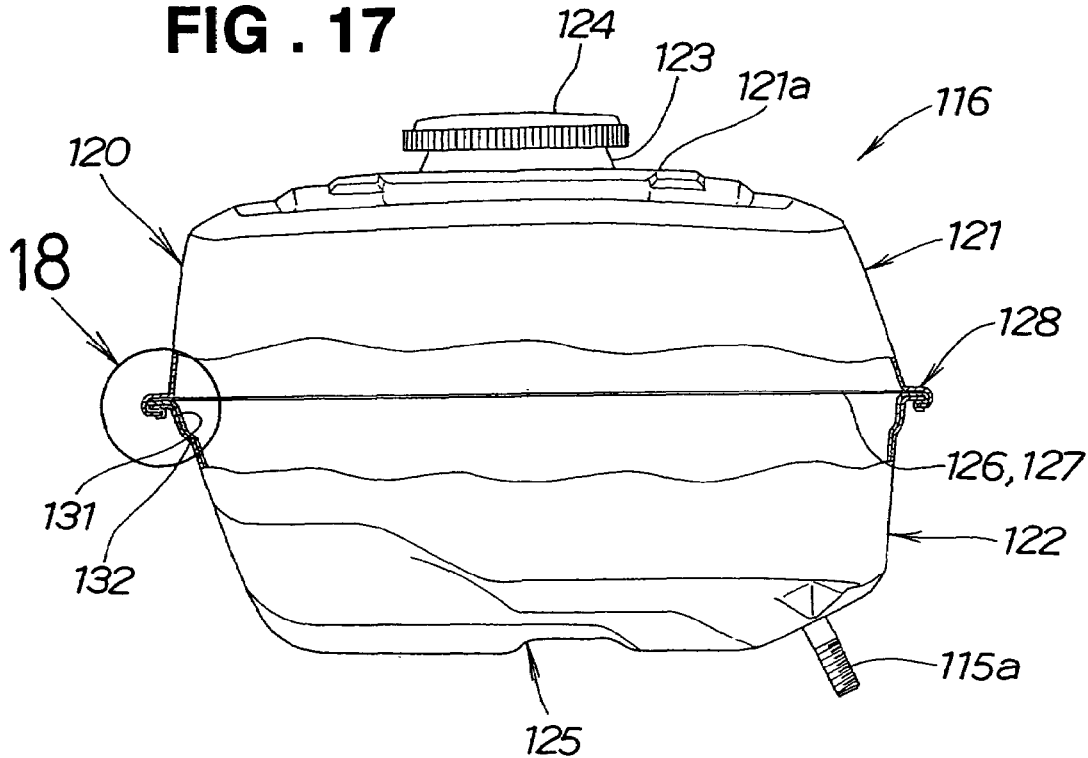
FIG. 17 is a side view of the fuel tank according to the third embodiment shown in FIG. 16.

As shown in FIG. 17, the fuel tank 116 has a tank body 120. The tank body 120 consists of an upper tank member 121 and a lower tank member 122 joined to the upper tank member 121. A filler port 123 is provided at an upper surface 121a of the upper tank member 121, and a cap 124 is attached to the filler port 123.

A fuel outlet port 125 is provided at the lower tank member 122, and a filter 126 for filtering out foreign matter in fuel is provided between the filler port 123 and the fuel outlet port 125.

This filter 126 is formed of a fluororesin element 127 having the property of not allowing water to pass through it but allowing fuel to pass through it. The filter 126 is held by division surfaces 128 between the upper tank member 121 and the lower tank member 122.

The fuel tank 116 includes, as its main components, the upper tank member 121 and the lower tank member 122 fixed to the lower edge of the upper tank member 121. The lower tank member 122 consists of an inner member 131 and an outer member 132. The inner member 131 serves as a container for storing fuel in combination with the upper tank member 121. The outer member 132 is provided outside of the inner member 131, having the function of supporting the fuel tank 116.

A bolt 115 for securing the fuel tank 116 is attached to the outer member 132.

Figure 18:
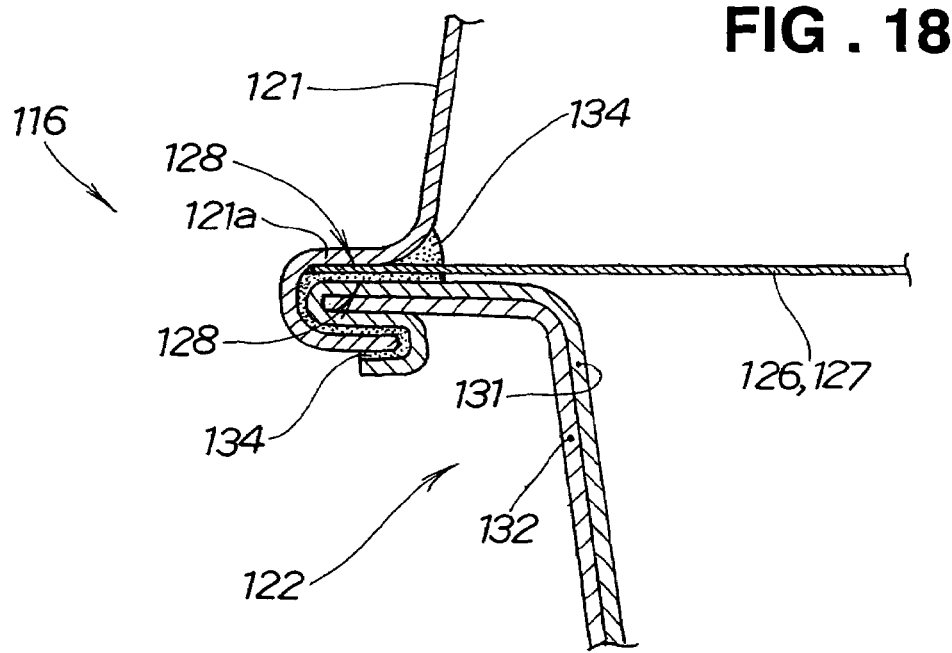
FIG. 18 is an enlarged cross-sectional view of a portion indicated at 18 in FIG. 17.

FIG. 18 illustrates the joint structure of the upper tank member 121, the lower tank member 122 consisting of the inner member 131 and the outer member 132, and the filter 126.

The inner member 131 is placed on a flange of the outer member 132 which has the function of supporting the fuel tank 116. The filter 126 is placed on the inner member 131. A flange 121a of the upper tank member 121 is placed on the filter 126 with a liquid sealer 134 interposed therebetween. The flange 121a is bent toward the lower tank member 122 at its entire periphery for fixing them to one another.

That is, the filter 126 is held by the division surfaces 128 between the upper tank member 121 and the lower tank member 122. The division surfaces 128 indicate a plane formed by abutting the flange 121a on the inner member 131 of the lower tank member 122.

It is acceptable to replace the liquid sealer 134 used for preventing fuel leakage with a packing for fixing.

Now, the use of the fuel tank 116 according to the third embodiment will be described with reference to FIGS. 19 and 20.

Figure 19:
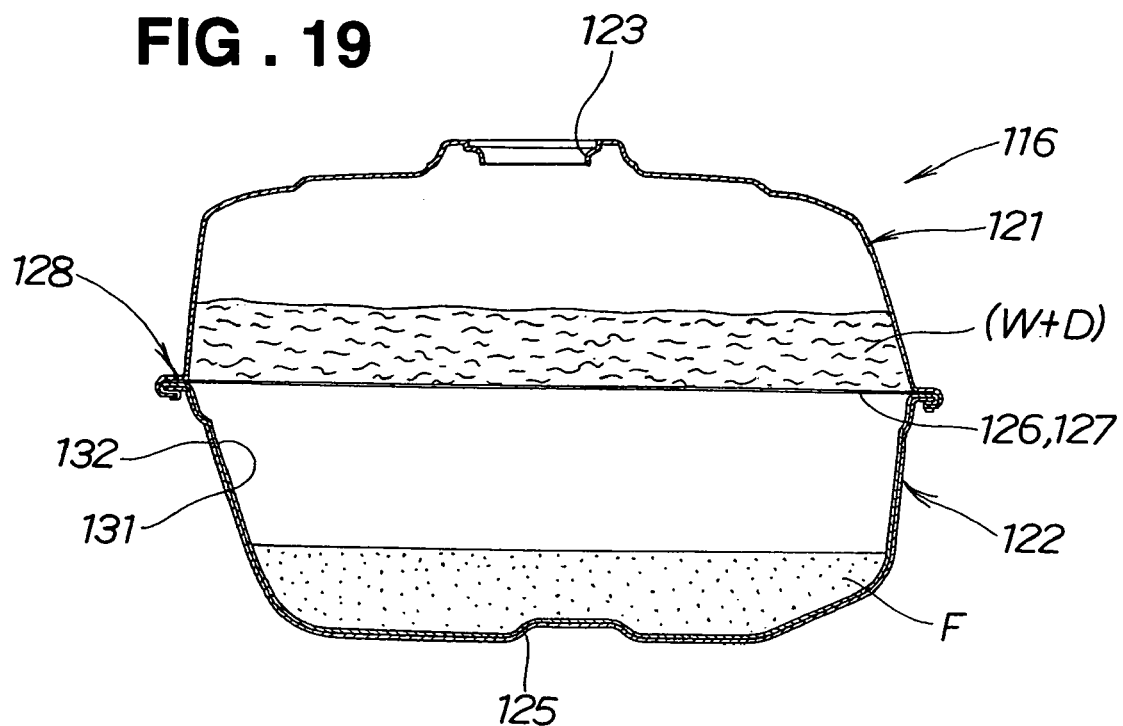
FIG. 19 is a diagram illustrating a state in which fuel containing water has been filtered by a fluororesin element disposed between an upper tank member and a lower tank member.

As shown in FIG. 19, fuel contaminated with foreign matter such as water, dirt, sand, mud or grass is fed through the filler port 123. When the fuel comes into contact with the filter 126, the fuel (F) passes through the filter 126, and water (W) and other foreign matter (D) are left on the upper side of the filter 126.

This filter 126 is formed of the fluororesin element 127. The fluororesin element 127 has the property of not allowing water to pass through it but allowing fuel to pass through it. Therefore, when fuel contaminated with water and other foreign matter reaches the filter 126, only the fuel (F) passes through it, and foreign matter such as water, dirt, sand, mud or grass does not pass through it. The fuel (F) with the water and other foreign matter removed is supplied to the engine body side through the fuel outlet port 125.

Since the filter 126 is disposed between the division surfaces 128 of the upper tank member 121 and the lower tank member 122, a large filtration area can be provided. The large filtration area can prevent the problem that water and other foreign matter cover the filter member 126, preventing smooth filtration of fuel.

Since the filter 126 is held between the division surfaces 128 of the upper tank member 121 and the lower tank member 122 when the upper tank member 121 is joined to the lower tank member 122, the filter 126 can be firmly fixed by a simple configuration. Thus, the need for a supporting member for mounting the filter 126 is eliminated, and product and production costs can be greatly reduced.

Since the filter 126 is provided in a location where it can be seen from the filler port 123, water accumulated on the filter 126 can be easily visually recognized.

Since water accumulated in the fuel tank 116 can be easily checked, it is possible to immediately determine the presence or absence of water in the fuel tank 116 and to remove accumulated water quickly.

Figure 20:
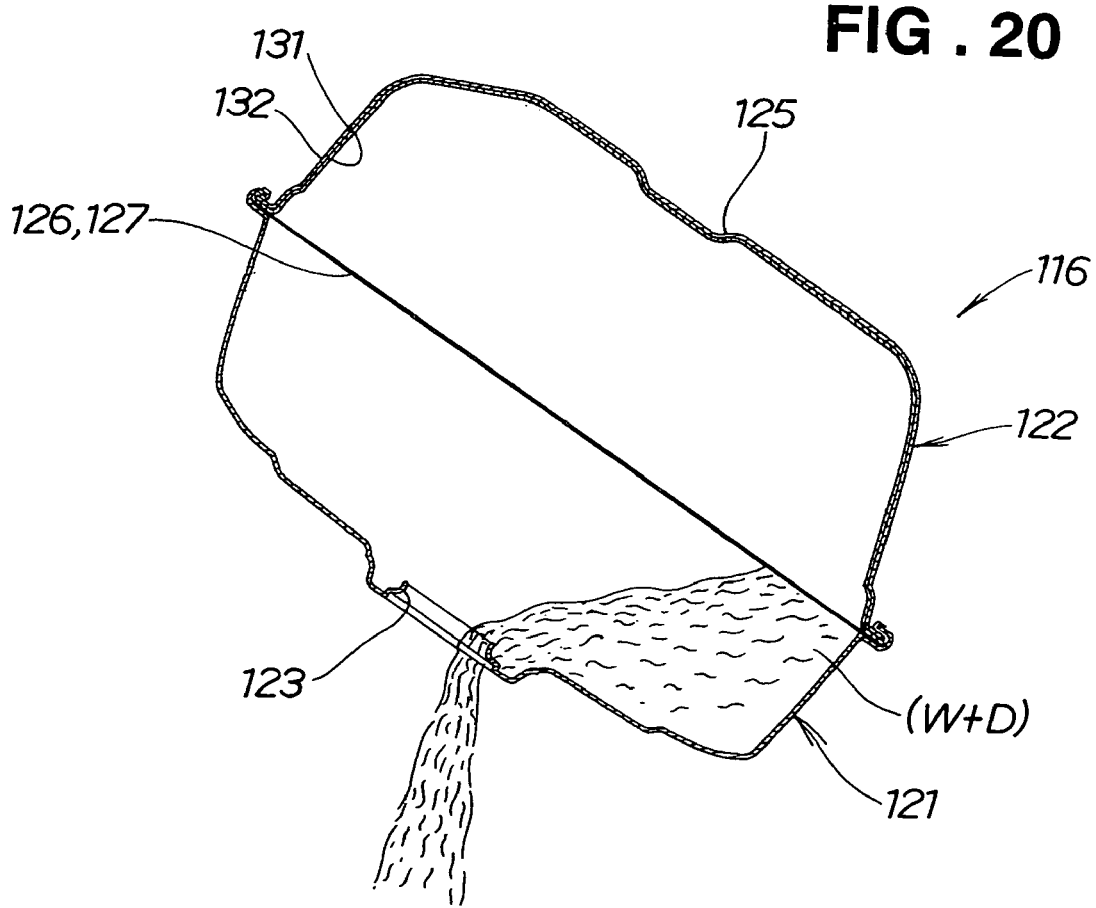
FIG. 20 is a diagram illustrating a state in which the fuel tank is tilted to remove water separated from fuel.
Figure 21:
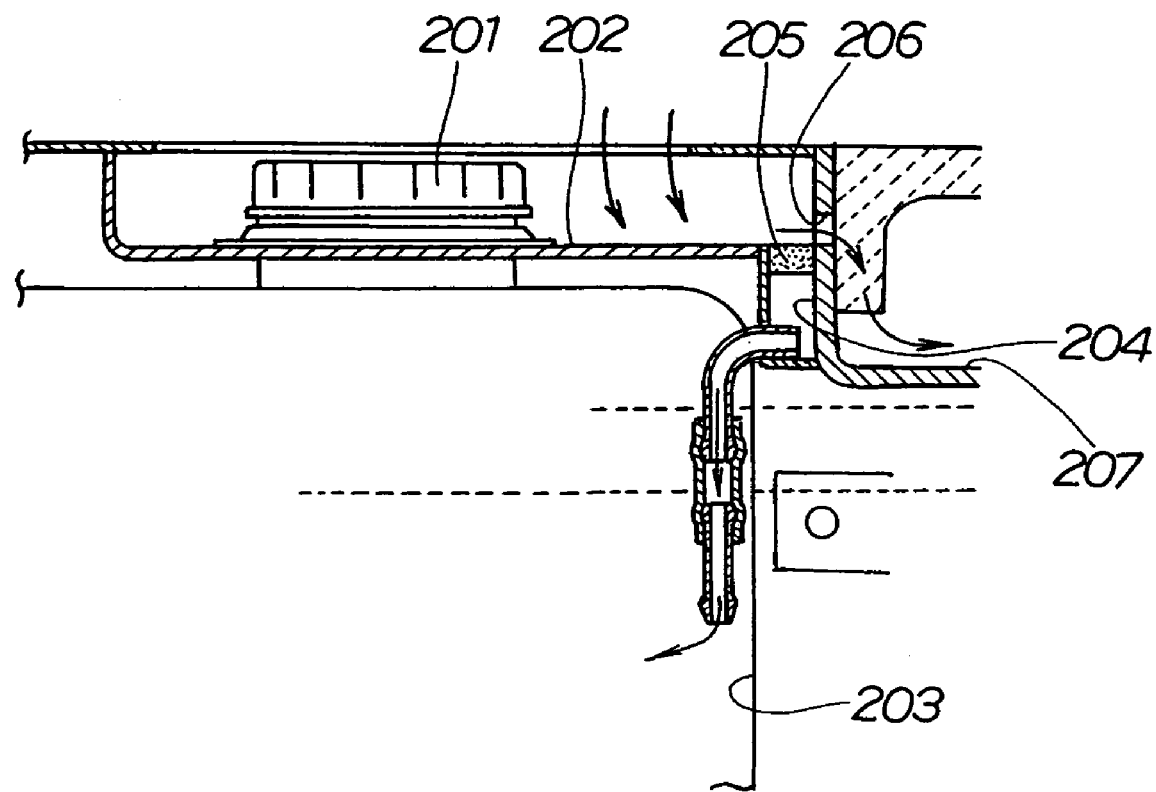
FIG. 21 is a diagram illustrating a basic configuration of a first prior art.
Figure 22:
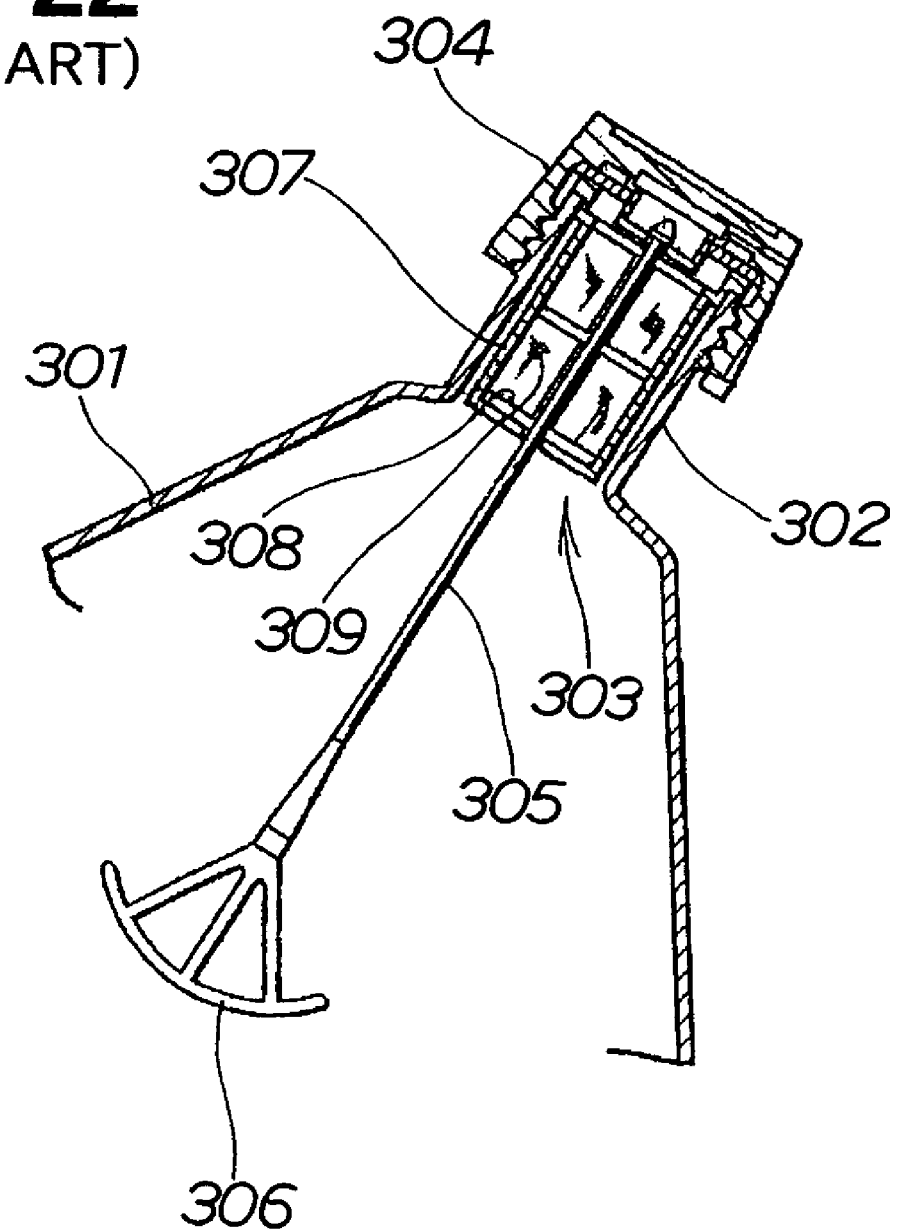
FIG. 22 is a diagram illustrating a basic configuration of a second prior art.
Figure 23:
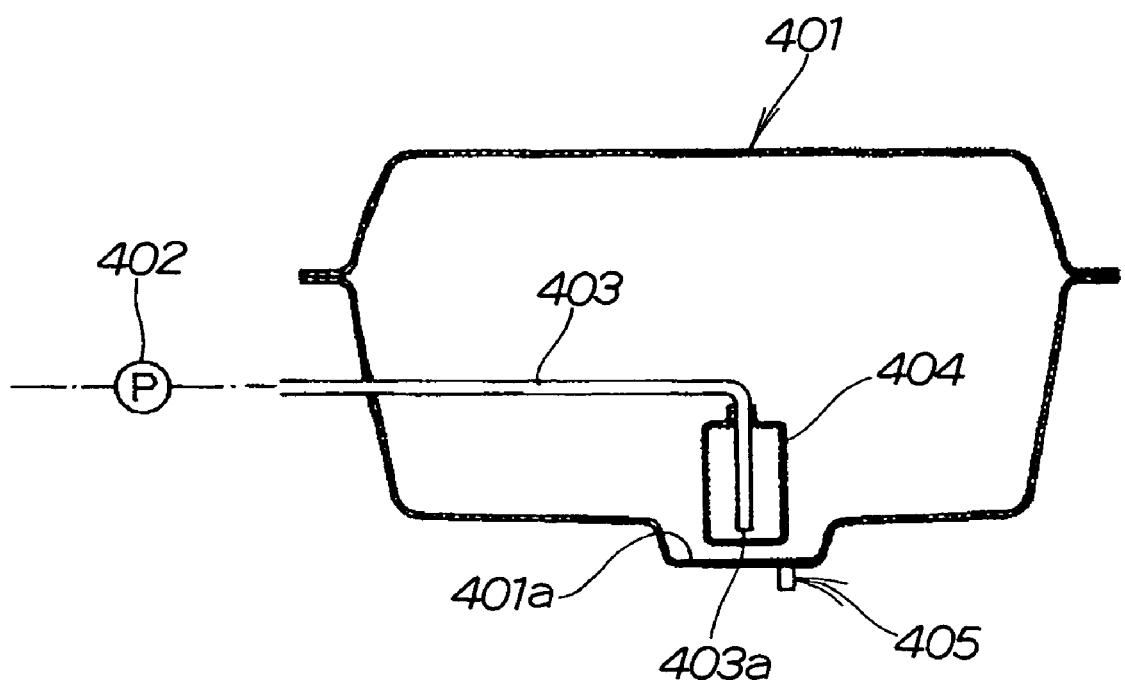
FIG. 23 is a diagram illustrating a basic configuration of a third prior art.

As shown in FIG. 20, water left on the filter 126 can be easily removed by tilting the fuel tank 116 which is integrally formed with the filter 126. Instead of tilting the fuel tank 16, it is acceptable to remove remaining water by a suction means such as a pipette. Water is thus prevented from staying in the fuel tank 16 for a long period of time, resulting in the prevention of the problem that water enters an engine and its induction system from the fuel tank 16.

According to the third embodiment as described above, fuel contaminated with water and other matter can be separated into fuel and water by a simple structure at low cost, and the separated water can be easily visually recognized and removed.

In the first to third embodiments described above, illustrated fuel tanks are applied to a general-purpose gasoline engine, but the present invention may also be applied to a fuel tank for a general-purpose diesel engine.

Obviously, various minor changes and modifications of the present invention are possible in the light of the above teaching. It is therefore to be understood that within the scope of the appended claims the invention may be practiced otherwise than as specifically described.

What is claimed is:

1. A fuel tank used for a general-purpose engine, the fuel tank comprising:
  a hollow tank body for storing fuel, the tank body having a bottom with a trap having an internal surface portion lying in a first plane; and
  a filter disposed within the tank body and comprising a fluororesin element having a property of not allowing water to pass therethrough but allowing fuel to pass therethrough, the fluororesin element having at least one main surface lying in a second plane disposed at an angle of inclination relative to the first plane;
  wherein the filter further comprises a tubular body supporting the fluororesin element and extending from the internal surface portion of the trap, the tubular body having first and second wall portions extending vertically to different heights from the bottom of the tank body and supporting the fluororesin element so that the at least one main surface of the fluororesin element lies in the second plane disposed at the angle of inclination relative to the first plane.

2. A fuel tank according to claim 1; wherein the second wall portion of the tubular body extends directly from the internal surface portion of the trap.

3. A fuel tank according to claim 1; wherein the tubular body is formed in one piece with the bottom of the tank body.

4. A fuel tank according to claim 1; wherein the tank body has a fuel outlet port; and wherein the tubular body is provided at an inlet of the fuel outlet port.

5. A fuel tank according to claim 4; wherein the first wall portion of the tubular body is formed in one piece with the inlet of the fuel outlet port.

6. A fuel tank according to claim 5; wherein the second wall portion of the tubular body extends directly from the internal surface portion of the trap.

* * * * *